(12) United States Patent
Song et al.

(10) Patent No.: US 11,147,353 B2
(45) Date of Patent: Oct. 19, 2021

(54) APPARATUS AND METHOD FOR MODEL RECONSTRUCTION USING PHOTOGRAMMETRY

(71) Applicant: Mani.Me, Inc., Santa Monica, CA (US)

(72) Inventors: Jooyeon Song, Santa Monica, CA (US); David Miro Llopis, Marina Del Rey, CA (US)

(73) Assignee: Mani.Me, Inc., Santa Monica, CA (US)

( * ) Notice: Subject to any disclaimer, the term of this patent is extended or adjusted under 35 U.S.C. 154(b) by 0 days.

(21) Appl. No.: 17/076,684

(22) Filed: Oct. 21, 2020

(65) Prior Publication Data

US 2021/0030133 A1 Feb. 4, 2021

Related U.S. Application Data

(63) Continuation of application No. 16/145,721, filed on Sep. 28, 2018.

(51) Int. Cl.
*G06T 7/55* (2017.01)
*A45D 31/00* (2006.01)
*G06T 17/10* (2006.01)

(52) U.S. Cl.
CPC .............. *A45D 31/00* (2013.01); *G06T 7/55* (2017.01); *G06T 17/10* (2013.01)

(58) Field of Classification Search
CPC ........... G06T 7/55; G06T 7/557; G06T 7/564; G06T 7/571; G06T 7/586; G06T 7/593;
(Continued)

(56) References Cited

U.S. PATENT DOCUMENTS 5,196,234 A   3/1993 Taubner et al.
5,382,217 A   1/1995 Namowitz
(Continued)

FOREIGN PATENT DOCUMENTS

JP   2012232042 A  * 11/2012
JP   2014-117455 A   6/2014
(Continued)

OTHER PUBLICATIONS

Goyal, Supriya, et al. "An improved method of studying fingernail morphometry: application to the early detection of fingernail clubbing." Journal of the American Academy of Dermatology 39.4 (1998): 640-642. (Year: 1998).*

(Continued)

*Primary Examiner* — Shefali D Goradia
(74) *Attorney, Agent, or Firm* — Lewis Roca Rothgerber Christie LLP

(57) ABSTRACT

A model reconstruction apparatus and method uses photogrammetry. The model reconstruction apparatus using photogrammetry may include an image-receiving unit for receiving image data in which images of a nail of a target, for which an artificial nail model is to be generated, and a standard specification object are taken together, an image-analyzing unit for recognizing shapes of a nail plate and a nail tip of the nail of the target from the image data, and determining parameters for the shape of the nail plate and the shape of the nail tip based on the standard specification object, and a model-generating unit for generating an artificial nail model based on the parameters.

20 Claims, 10 Drawing Sheets

(58) Field of Classification Search
CPC .. G06T 7/596; G06T 7/60; G06T 7/62; G06T 17/10; A45D 31/00
USPC ........................................................ 382/154
See application file for complete search history.

(56) References Cited

U.S. PATENT DOCUMENTS

| | | | |
|---|---|---|---|
| 6,328,949 B1* | 12/2001 | Tessarolo | A45D 29/001 132/73 |
| 2004/0143359 A1* | 7/2004 | Yogo | A45D 31/00 700/161 |
| 2011/0087351 A1* | 4/2011 | Sachdeva | G06F 30/00 700/98 |
| 2012/0103210 A1 | 5/2012 | Hashimoto | |
| 2013/0038648 A1* | 2/2013 | Kasahara | B41J 3/407 347/2 |
| 2014/0183769 A1* | 7/2014 | Li | A45D 31/00 264/40.1 |
| 2015/0173483 A1* | 6/2015 | Raouf | A45D 29/001 132/200 |
| 2017/0193651 A1* | 7/2017 | Yamasaki | G06K 9/00375 |
| 2018/0336737 A1* | 11/2018 | Varady | G06T 7/536 |
| 2020/0135310 A1* | 4/2020 | Gedamu | G16H 50/70 |

FOREIGN PATENT DOCUMENTS

| | | |
|---|---|---|
| KR | 10-2011-0101106 | 9/2011 |
| KR | 10-2011-0101106 A | 9/2011 |
| KR | 10-1844347 B1 | 5/2018 |
| KR | 101844347 B1 * | 5/2018 |
| WO | WO2015/132734 * | 9/2015 |

OTHER PUBLICATIONS

Goyal, Supriya, et al, "An improved method of studying fingernail morphometry: application to the early detection of the fingernail clubbing." Journal of American Academy of Dermatology 39.4 (1998): 640-642. (Year: 1998).

ManiMe. Facebook. www.facebook.com/ManiMe.co/. Accessed Apr. 6, 2020. (Year: 2018).

"Mani.Me: hassle-free gel manicures," Kickstarter, May 26, 2018:// www.kickstarter.com/projects/1020368929/manime-hassel-free-gel-manicures. Accessed Apr. 6, 2020. (Year 2018).

International Search Report and Written Opinion for corresponding Application No. PCT/KR2019/012475, dated Jan. 23, 2020, including part. Engl. Translation (9 pages).

* cited by examiner

APPARATUS AND METHOD FOR MODEL RECONSTRUCTION USING PHOTOGRAMMETRY

BACKGROUND

1. Technical Field

The present disclosure relates generally to image recognition technology and three-dimensional (3D) modeling technology, and more particularly, to model reconstruction technology using photogrammetry.

2. Description of the Related Art

Women use artificial nails mainly of plastic materials such as a patch made of plastic armor in order to beautify their nails. Artificial nails that are currently on the market are fabricated using injection molding suitable for standard specifications (standard sizes and curvatures). A set of artificial nails sold to consumers may contain artificial nails corresponding to a total of 20 to 30 pieces in such a way that there are 10 to 15 sizes and two pieces are present per size. However, since the sizes, shapes, and angles of nails may differ for respective persons, it is nearly impossible for the sizes of 10 to 15 artificial nails to perfectly fit the nails of respective consumers. Due to this disadvantage, artificial nails are inevitably easy to distinguish from natural human nails, and respective users have nails of different sizes, and thus a problem may arise in that the users feel discomfort due to poor wearability, and such artificial nails are easily detached from natural nails.

Meanwhile, U.S. Pat. No. 6,196,234 entitled "Precision fit fingernails" and U.S. Pat. No. 6,382,217 entitled "Process for fabricating custom fit removable and reusable metal fingernails" disclose a method for fabricating custom-fit artificial nails using molds made from a user's nails.

However, U.S. Pat. Nos. 6,196,234 and 6,382,217 are limited in that a complicated mold-making process is required.

Further, technology entitled "Artificial Nail Manufacture Service System" in Korean Patent Application Publication No. 10-2011-0101106 discloses a system for fabricating and supplying personally customized artificial nails, which detects 3D data about the nail shape of a consumer using a scanning system, simulates artificial nail shapes of the consumer meeting the consumer's request using the 3D data, and then fabricates and provides the artificial nails.

However, technology disclosed in Korean Patent Application Publication No. 10-2011-0101106 is limited in user accessibility in that a 3D scanning device dedicated to scanning nails must be used.

SUMMARY OF THE DISCLOSURE

Accordingly, the present disclosure has been made keeping in mind the above problems occurring in the prior art, and an object of the present disclosure is to conveniently and simply provide a user-customized artificial nail model suitable for a user.

Another object of the present disclosure is to generate a user-customized artificial nail model from a reference artificial nail model that complies with existing standard specifications without requiring a complicated process or special tool.

In accordance with an aspect of the present disclosure to accomplish the above objects, there is provided a model reconstruction apparatus using photogrammetry, including an image-receiving unit for receiving image data in which images of a nail of a target, for which an artificial nail model is to be generated, and a standard specification object are taken together; an image-analyzing unit for recognizing shapes of a nail plate and a nail tip of the nail of the target from the image data, and determining parameters for the shape of the nail plate and the shape of the nail tip based on the standard specification object; and a model-generating unit for generating an artificial nail model based on the parameters.

The standard specification object may be an object manufactured in conformity with international standards.

The image data may include a first image for recognizing the shape of the nail plate and a second image for recognizing the shape of the nail tip.

The first image and the second image may be taken in a state in which the standard specification object is in close contact with a bottom of a finger of the target.

The first image may be taken of the nail plate of the target together with the standard specification object from a viewpoint in which a back of a hand of the target is viewed.

The second image may be taken of the nail tip together with the standard specification object from a viewpoint in which a fingertip of the target is viewed.

The second image may be taken in a state in which a bottom of a thumb of the target is in close contact with a first surface of the standard specification object and in which all of bottoms of remaining four fingers of the target are in close contact with a second surface of the standard specification object.

The image-analyzing unit may recognize the shape of the nail plate from the first image from a viewpoint in which the back of the hand is viewed, and determines parameters for the shape of the nail plate based on the standard specification object.

The image-analyzing unit may set at least four points on a nail wall of the nail plate in the first image from a viewpoint in which the back of the hand of the target is viewed, and may then determine the parameters using the at least four points as coordinate values for the shape of the nail plate.

The image-analyzing unit may determine a type of a nail shape of at least one selectable artificial nail model from the first image, based on the shape of the nail plate recognized from a viewpoint in which the back of the hand of the target is viewed.

The image-analyzing unit may recognize the shape of the nail tip from the second image from a viewpoint in which the fingertip of the target is viewed, and may determine parameters for the shape of the nail tip based on the standard specification object.

The image-analyzing unit may set two points at positions corresponding to both sides of the nail in the second image in such a way as to set one point per position from a viewpoint in which the fingertip of the target is viewed, may set an additional point at least one position on the nail tip, and may then determine the parameters using the two points and the additional point as coordinate values for the shape of the nail tip.

The image-analyzing unit may generate a straight line connecting the two points, and may set a position on the nail tip, which is perpendicular to that straight line and meets a perpendicular line passing through the nail plate of the target, as the additional point.

The model-generating unit may adjust shapes of a nail plate and a nail tip of a reference artificial nail model based on the coordinate values for the shape of the nail plate and the shape of the nail tip, and may generate the artificial nail model from the reference artificial nail model, the shapes of the nail plate and the nail tip of which have been adjusted.

The model-generating unit may determine a scale value of the artificial nail model corresponding to the standard specification object based on coordinate values of the artificial nail model and coordinate values of the standard specification object.

In accordance with another aspect of the present disclosure to accomplish the above objects, there is provided a model reconstruction method using photogrammetry, performed by a model reconstruction apparatus using photogrammetry, including receiving image data in which images of a nail of a target, for which an artificial nail model is to be generated, and a standard specification object are taken together; recognizing shapes of a nail plate and a nail tip of the nail of the target from the image data, and determining parameters for the shape of the nail plate and the shape of the nail tip based on the standard specification object; and generating an artificial nail model based on the parameters.

In a further aspect, a model reconstruction method using photogrammetry is disclosed. The model reconstruction method may be performed by a model reconstruction system comprising at least one processor and at least one memory, the at least one memory comprising instructions executed by the at least one processor to perform the model reconstruction method. The model reconstruction method may include receiving image data of a nail of a target with a standard specification object, and recognizing a first shape of a nail plate of the nail and a second shape of a nail tip of the nail of the target from the image data. The model reconstruction method may also include determining a first set of parameters based on the first shape and a second set of parameters based on the second shape, adjusting a third shape of a first artificial nail model to comply with the first set of parameters and the second set of parameters, and using the third shape of the first artificial nail model to construct an artificial nail for the target.

In any of the disclosed implementations, the model reconstruction method may further include selecting a second artificial nail model corresponding to the nail based on at least one of the first set of parameters.

In a further aspect, a second model reconstruction system is disclosed. The second model reconstruction system may include at least one processor and at least one memory, the at least one memory comprising instructions executable by the at least one processor. In the second model reconstruction system, the instructions may be executable to receive image data of a nail of a target with a standard specification object, and recognize a first shape of a nail plate of the nail and a second shape of a nail tip of the nail from the image data. In the second model reconstruction system, the instructions may also be executable to determine a first set of parameters based on the first shape and a second set of parameters based on the second shape, adjust a third shape of a first artificial nail model to comply with the first set of parameters and the second set of parameters, and generate a nail model for the nail, wherein the nail model comprises the third shape of the first artificial nail model.

In any of the disclosed implementations of the second model reconstruction system, the standard specification object may be one of a credit card, a currency note, a coin, and a paper.

In any of the disclosed implementations of the second model reconstruction system, the image data may include a first image for recognizing the first shape and a second image for recognizing the second shape.

In any of the disclosed implementations of the second model reconstruction system, the first image and the second image may include the standard specification object in contact with a fingertip of the target.

In any of the disclosed implementations of the second model reconstruction system, the first image may include a back of a hand of the target. In any of the disclosed implementations of the second model reconstruction system, the second image may include a fingertip of the target.

In any of the disclosed implementations of the second model reconstruction system, the second image may include a thumb of the target in contact with a first surface of the standard specification object, and at least one fingertip of the target in contact with a second surface of the standard specification object.

In any of the disclosed implementations of the second model reconstruction system, the instructions to determine the first set of parameters may further include instructions to determine respective coordinate values of at least four wall points on a nail wall of the nail plate in the first image, wherein the at least four wall points represent the first shape.

In any of the disclosed implementations of the second model reconstruction system, the instructions to determine the second set of parameters may further include instructions to determine respective coordinate values of at least two side points at positions corresponding to both sides of the nail in the second image and one top point at one position on the nail tip, wherein the two side points and one top point represent the second shape.

In any of the disclosed implementations of the second model reconstruction system, the instructions to determine the second set of parameters may further include instructions to generate a straight line connecting the two side points, and set the top point perpendicular to the straight line, wherein a line connecting the top point and a midpoint of the straight line is perpendicular to the straight line.

In any of the disclosed implementations of the second model reconstruction system, the instructions may further include instructions to perform a comparison between the first shape and a fourth shape representing the second artificial nail model, and select a second artificial nail model based on the comparison.

In any of the disclosed implementations of the second model reconstruction system, the comparison comprises at least one of comparing a first length of the nail of the target with a second length of the nail of the second artificial nail model and comparing a first width of the nail of the target with a second width of the nail of the second artificial nail model.

In any of the disclosed implementations of the second model reconstruction system, the instructions may further include instructions to recommend the second artificial nail model to the target.

In any of the disclosed implementations of the second model reconstruction system, the instructions may further include instructions to recognize a fifth shape of a nail side of the target based on the image data, determine a third set of parameters based on the fifth shape, and adjust the third shape to comply with the third set of parameters.

In any of the disclosed implementations of the second model reconstruction system, the image data may further include a third image for recognizing the fifth shape, wherein the third image comprises a side of a finger of the target.

In any of the disclosed implementations of the second model reconstruction system, the instructions may further include instructions to generate learning data comprising at least one of the image data and one or more of the parameters, wherein the learning data is used to determine a sixth shape representing a third artificial nail model.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
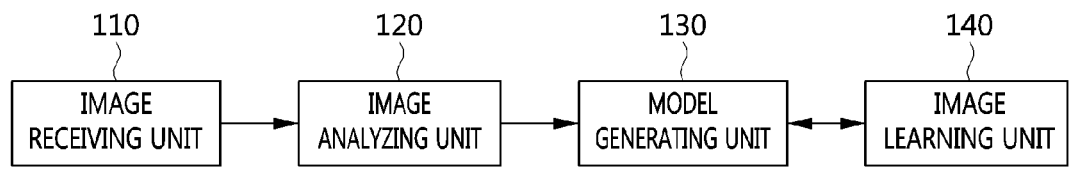
FIG. 1 is a block diagram illustrating a model reconstruction apparatus using photogrammetry according to an embodiment of the present disclosure.

The present disclosure will be described in detail below with reference to the accompanying drawings. Repeated descriptions and descriptions of known functions and configurations which have been deemed to make the gist of the present disclosure unnecessarily obscure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated to make the description clearer.

In the specification, when an element is referred to as "comprising" or "including" a component, it does not preclude another component, but may further include other components unless the context clearly indicates otherwise.

Hereinafter, embodiments of the present disclosure will be described in detail with reference to the attached drawings.

Figure 2:
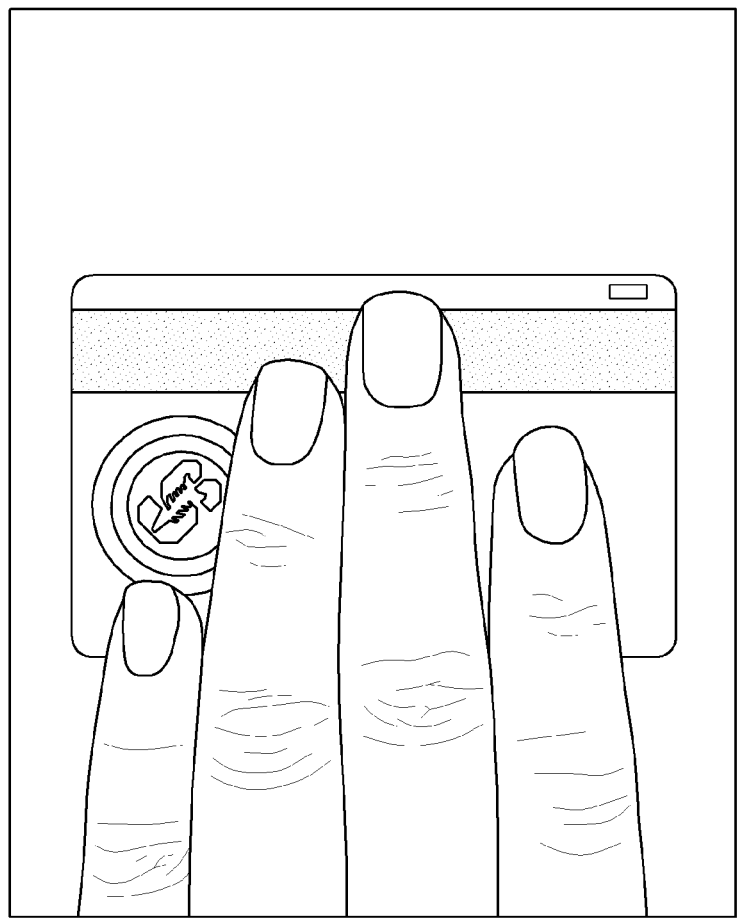
FIG. 2 is a diagram illustrating an image taken of four fingers, which are in close contact with a standard specification object, from a viewpoint in which the back of a target's hand is viewed according to an embodiment of the present disclosure.
Figure 3:
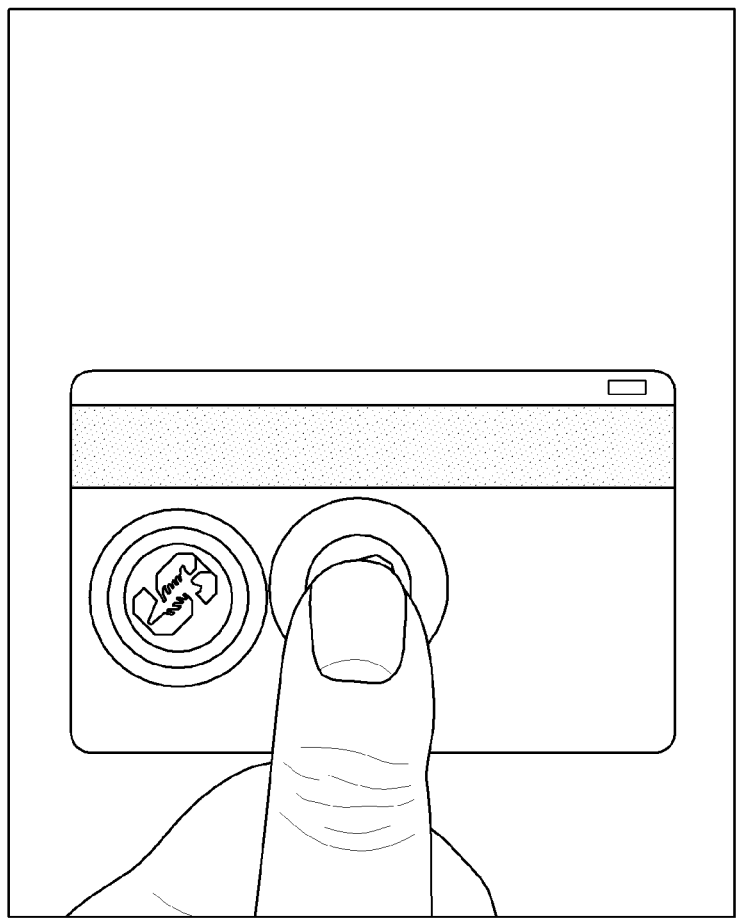
FIG. 3 is a diagram illustrating an image taken of a thumb, which is in close contact with a standard specification object, from a viewpoint in which the back of a target's hand is viewed according to an embodiment of the present disclosure.
Figure 4:
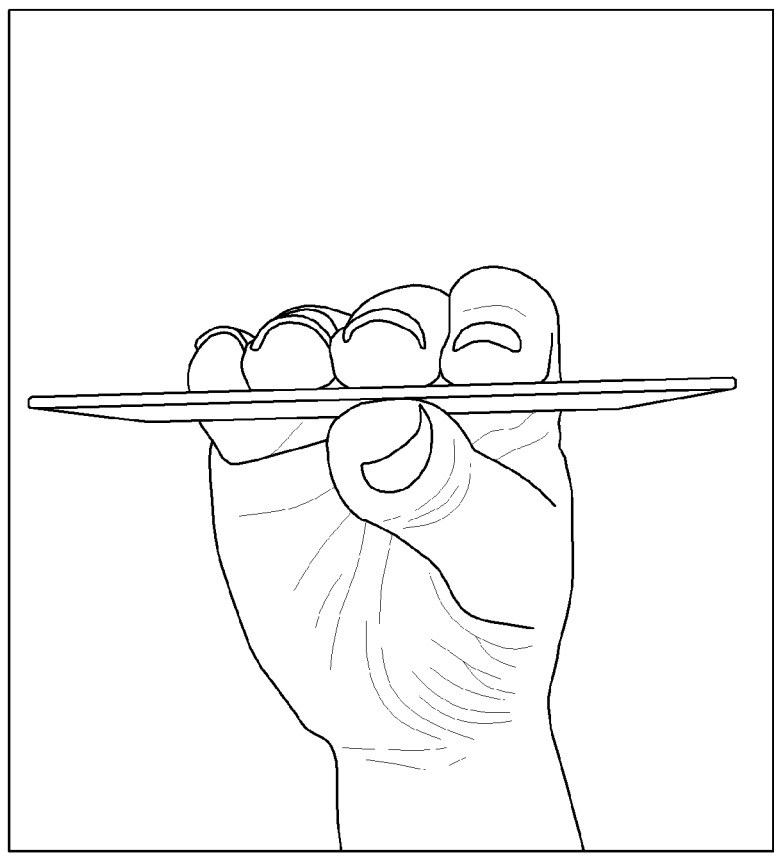
FIG. 4 is a diagram illustrating an image taken of fingers, which are in close contact with a standard specification object, from a viewpoint in which the fingertips of a target are viewed according to an embodiment of the present disclosure.
Figure 5:
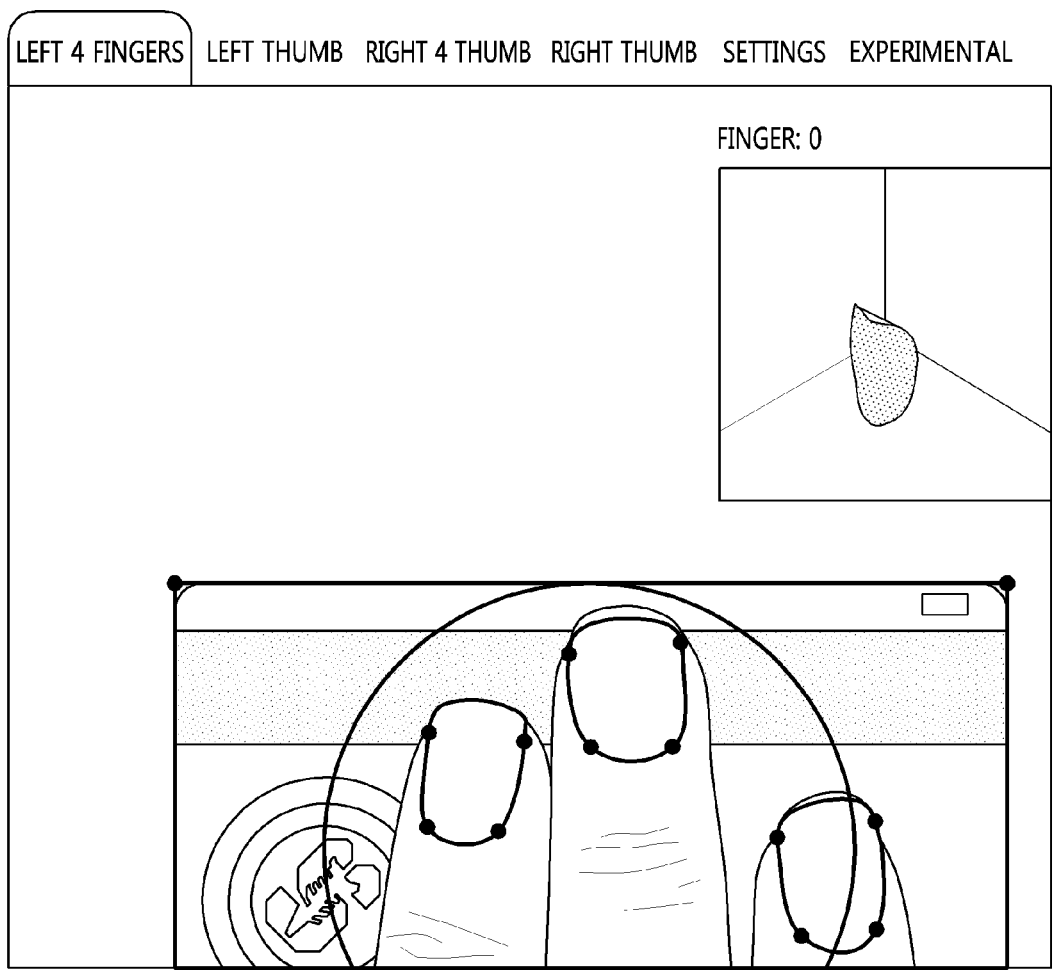
FIG. 5 is a diagram illustrating point settings for recognition of the shapes of nail bodies (nail plates) and determination of coordinate values of the nail plates in an image according to an embodiment of the present disclosure.
Figure 6:
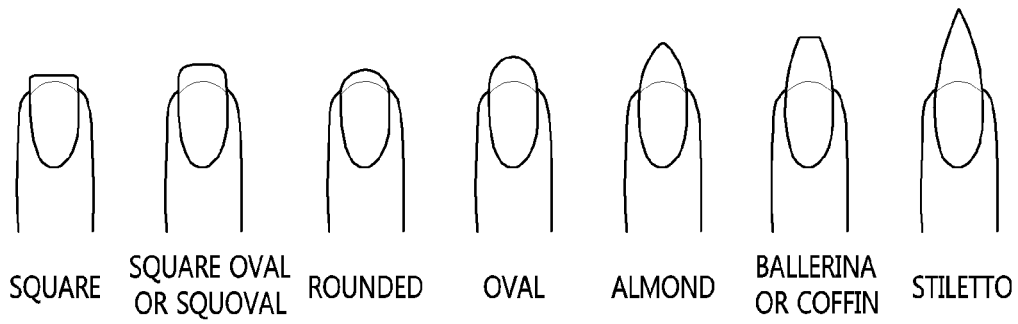
FIG. 6 is a diagram illustrating the types of nail shapes of selectable artificial nail models according to an embodiment of the present disclosure.
Figure 7:
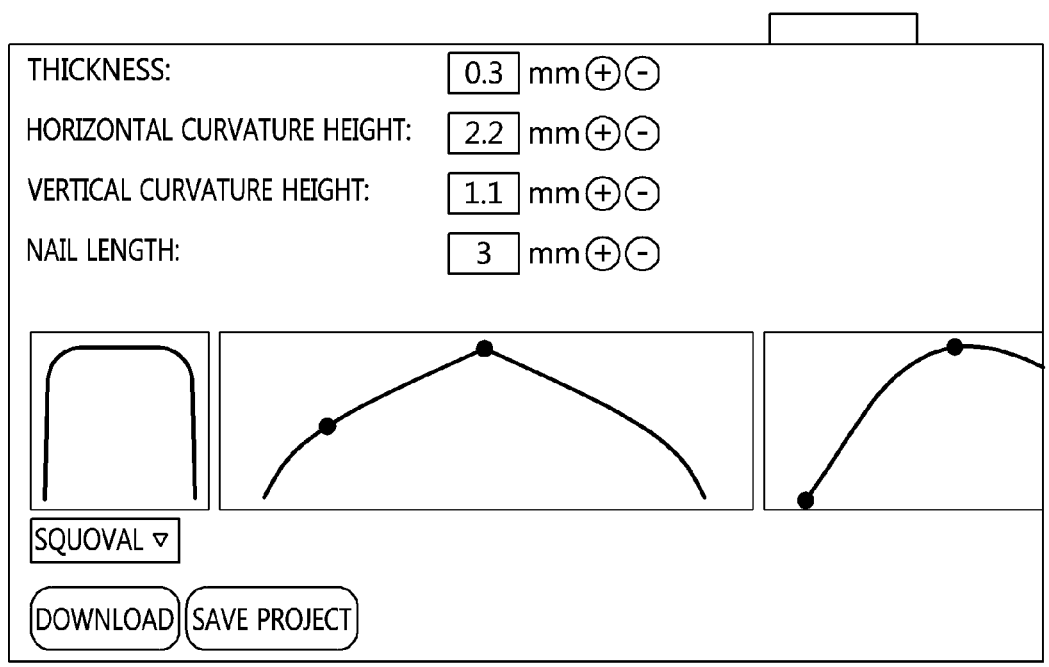
FIG. 7 is a diagram illustrating point settings for recognition of the shapes of nail tips (free edges of nails) and determination of coordinate values of the nail tips in an image according to an embodiment of the present disclosure.
Figure 8:
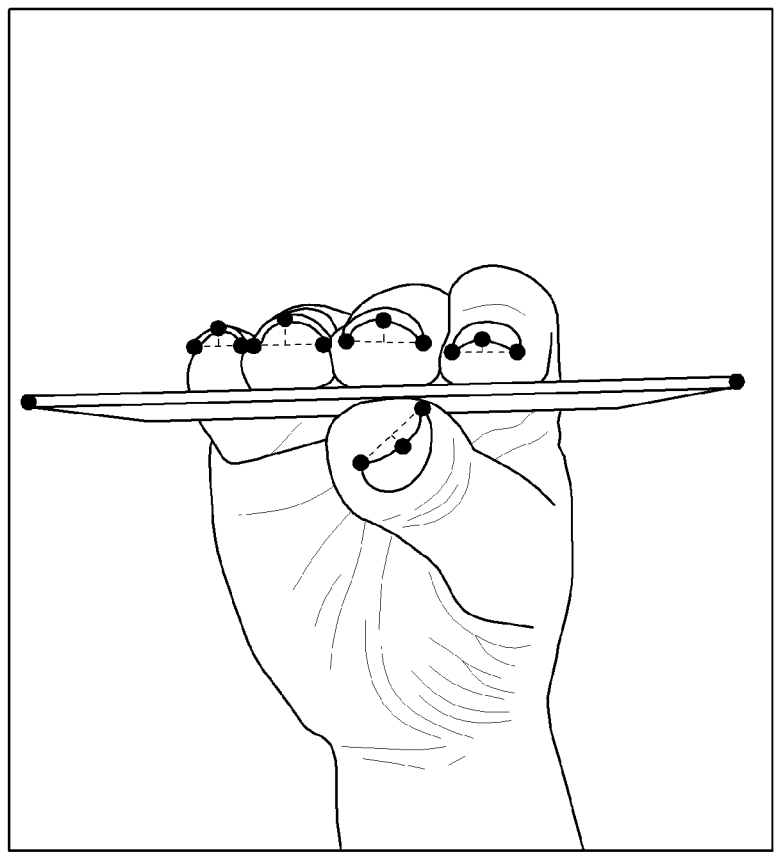
FIG. 8 is a diagram illustrating detailed adjustment of an artificial nail model according to an embodiment of the present disclosure.

FIG. 1 is a block diagram illustrating a model reconstruction apparatus using photogrammetry according to an embodiment of the present disclosure. FIG. 2 is a diagram illustrating an image taken of four fingers, which are in close contact with a standard specification object, from a viewpoint in which the back of a target's hand is viewed according to an embodiment of the present disclosure. FIG. 3 is a diagram illustrating an image taken of a thumb, which is in close contact with a standard specification object, from a viewpoint in which the back of a target's hand is viewed according to an embodiment of the present disclosure. FIG. 4 is a diagram illustrating an image taken of fingers, which are in close contact with a standard specification object, from a viewpoint in which the fingertips of a target are viewed according to an embodiment of the present disclosure. FIG. 5 is a diagram illustrating point settings for recognition of the shapes of nail bodies (nail plates) and determination of coordinate values of the nail plates in an image according to an embodiment of the present disclosure. FIG. 6 is a diagram illustrating the types of nail shapes of selectable artificial nail models according to an embodiment of the present disclosure. FIG. 7 is a diagram illustrating point settings for recognition of the shapes of nail tips (free edges of nails) and determination of coordinate values of the nail tips in an image according to an embodiment of the present disclosure. FIG. 8 is a diagram illustrating detailed adjustment of an artificial nail model according to an embodiment of the present disclosure.

Referring to FIG. 1, the model reconstruction apparatus using photogrammetry according to the embodiment of the present disclosure includes an image-receiving unit 110, an image-analyzing unit 120, a model-generating unit 130, and an image-learning unit 140.

The image-receiving unit 110 may receive image data in which images of the nails of a target, for which a model of artificial nails is to be generated, and a standard specification object are taken together.

First, a user terminal device may generate the image data by taking an image of the nails of the target together with the standard specification object.

Here, the image data may be generated using various types of user terminal devices, such as a smartphone, a smart tablet, or a digital camera, which can take a two-dimensional (2D) digital image and then generate image data.

The user terminal device may request the user to generate image data needed to generate the model of artificial nails (hereinafter also referred to as the "artificial nail model") under the guidance of an application, software or a website for providing an artificial nail model generation service.

The application, software, or website for providing the artificial nail model generation service may output information needed to generate the artificial nail model as a message through the user terminal device.

The information needed to generate the artificial nail model may include a message for explaining a method for taking an image of the target's hand in order to generate the artificial nail model, and the like.

Here, the application, software, or website for providing the artificial nail model generation service may control the user terminal device so that image data needed to generate the artificial nail model is taken using a built-in camera installed in the user terminal device.

Also, the user terminal device may transmit the image data to the model reconstruction apparatus using photogrammetry over a network.

Here, the user terminal device may also upload the image data onto the application, software, or website for providing the artificial nail model generation service.

The image-receiving unit 110 may receive the image data from the user terminal device over the network, or may download the image data, uploaded by the user to request the generation of artificial nails, from the application, software, or website for providing the artificial nail model generation service.

Here, the image data may include a first image for recognizing the shape of each nail body (i.e. each nail plate) and a second image for recognizing the shape of each nail tip (i.e. the free edge of each nail).

It can be seen that FIGS. 2 and 3 illustrate examples of the first image, and that FIG. 4 illustrates an example of the second image.

Referring to FIGS. 2 to 4, the first image and the second image may be taken in the state in which a standard specification object is in close contact with the bottoms of the fingers of the target.

In particular, as illustrated in FIGS. 2 and 3, the first image may be obtained by taking an image of the nail plates of the target together with the standard specification object from a viewpoint in which the back of the target's hand is viewed.

Further, the first image may include an image taken in the state in which the bottom of the thumb of a left hand is in close contact with the standard specification object from a viewpoint in which the back of the target's hand is viewed, an image taken in the state in which the bottoms of the remaining four fingers of the left hand are in close contact with the standard specification object from a viewpoint in which the back of the target's hand is viewed, an image taken in the state in which the bottom of the thumb of a right hand is in close contact with the standard specification object from a viewpoint in which the back of the target's hand is viewed, and an image taken in the state in which the bottoms of the remaining four fingers of the right hand are in close contact with the standard specification object from a viewpoint in which the back of the target's hand is viewed.

In particular, as illustrated in FIG. 4, the second image may be obtained by taking an image of nail tips (free edges of nails) together with the standard specification object from a viewpoint in which the fingertips of the target are viewed.

Here, the second image may include a left hand image and a right hand image taken in the state in which the bottom of the thumb of the target's corresponding hand is in close contact with one surface of the standard specification object and in which all of the bottoms of the remaining four fingers are in close contact with the other surface of the standard specification object.

Here, in the case of the second image, the image of the fingertips of the target must be taken from a viewpoint opposite the direction in which the fingers are extended in order to recognize the extents to which the nail tips are curved (i.e. the extents of curvature of the nail tips).

Also, the image data may further include a third image obtained by taking an image of the sides of the fingers in order to recognize the extents to which nail plates are curved.

The standard specification object may be an object made based on international standards.

For example, the standard specification object may be an object manufactured based on international standards developed by the International Organization for Standardization (ISO), and the object manufactured based on the international standards may be any of various objects such as credit cards, bills, coins, and paper.

A credit card will be described below as an example of the standard specification object according to the embodiment of the present disclosure.

The image-analyzing unit 120 may recognize the shapes of nail plates and nail tips of the nails of the target from the image data, and may determine parameters for the shapes of nail plates and the shapes of nail tips based on the standard specification object.

Referring to FIG. 5, the image-analyzing unit 120 may recognize, from the first image, the shapes of the nail plates from a viewpoint in which the back of the hand is viewed, and may determine parameters for the shapes of the nail plates based on the standard specification object.

The image-analyzing unit 120 may set at least four points on the nail wall of each nail plate, from a viewpoint in which the back of the target's hand is viewed, in the first image, and may then determine the parameters using the at least four points as coordinate values for the shape of the corresponding nail plate.

Here, the image-analyzing unit 120 may determine the type of nail shape of at least one selectable artificial nail model based on the shape of the nail plate recognized from the first image from a viewpoint in which the back of the target's hand is viewed.

Referring to FIG. 6, it can be seen that the types of nail shapes of the artificial nail models, which are selectable by the model reconstruction apparatus using photogrammetry according to the embodiment of the present disclosure, are depicted.

The types of nail shapes according to the embodiment of the present disclosure may include a square shape, a square oval, squoval or semi-square shape, a rounded shape, an oval shape, an almond shape, a ballerina or coffin shape, and a stiletto shape, and may further include additional nail shapes.

Here, the image-analyzing unit 120 may select one or more of the nail shapes of the artificial nail model in order to recommend the nail shape of an artificial nail model to the user by comparing the recognized shape of the nail plate of the target with the nail plate of the reference artificial nail model, and may recommend the selected nail shapes of the artificial nail model to the user through the user terminal device.

For example, when the length of the nail of a target is longer than that of the nail of the reference artificial nail model, the image-analyzing unit 120 may select a square, square oval, squoval or semi-square shape. When the length of the nail of the target is less than that of the nail of the reference artificial nail model, the image-analyzing unit 120 may recommend a rounded shape. When the width of the nail of the target is less than that of the nail of the reference artificial nail model, the image-analyzing unit 120 may select an oval or almond shape.

Also, the image-analyzing unit 120 may recognize the shape of each nail tip from the second image from a viewpoint in which the fingertips of the target are viewed, and may determine parameters for the shape of the nail tip based on the standard specification object.

Referring to FIG. 7, the image-analyzing unit 120 may set two points at positions corresponding to both sides of each nail from the second image in such a way as to set one point per position from a viewpoint in which the fingertips of the target are viewed, may set an additional point at at least one position on the nail tip, and may then determine the parameters using the two points and the additional point as coordinate values for the shape of the nail tip.

The image-analyzing unit 120 may generate a straight line connecting the two points, and may set a point on the nail tip, which is perpendicular to that straight line and meets a perpendicular line passing through the nail plate of the target, as the additional point.

Here, the image-analyzing unit 120 may set two points on the standard specification object, may generate a straight line connecting the two points, and may adjust the locations of coordinate values for the shape of the nail tip using the slope of the straight line generated on the standard specification object.

Also, the image-analyzing unit 120 may recognize, from the third image, the shape of each nail side, taken from a viewpoint in which the sides of the fingers of the target are viewed, and may determine parameters for the shape of the nail side.

Here, the image-analyzing unit 120 may set two points at the nail tip (free edge) and the nail root of the nail plate in the third image in such a way as to set one point at the nail tip and the other point at the nail root from a viewpoint in which the side of each finger is viewed, may set an additional point at at least one position on the nail plate, and may then determine the parameters using the two points and the additional point as coordinate values for the shape of the nail side.

The image-analyzing unit 120 may generate a straight line connecting the two points, and may set a position on the nail plate, which is perpendicular to that straight line and meets a perpendicular line passing through the nail plate of the target, as the additional point.

Here, the image-analyzing unit 120 may set two points on the standard specification object, may generate a straight line connecting the two points, and may adjust the locations of coordinate values for the shape of the nail side using the slope of the straight line generated in the standard specification object.

The model-generating unit 130 may generate an artificial nail model based on the parameters.

The model-generating unit 130 may adjust the shape of each nail plate for the reference artificial nail model based on the coordinate values for the shape of each nail plate, and may generate the artificial nail model from the reference artificial nail model, the shape of the nail plate of which has been adjusted.

The model-generating unit 130 may adjust the shape of each nail tip of the reference artificial nail model based on the coordinate values for the shape of each nail tip, and may generate the artificial nail model from the reference artificial nail model, the shape of the nail tip of which has been adjusted.

The model-generating unit 130 may adjust the shape of the side of each nail plate of the reference artificial nail model based on the coordinate values for the shape of the side of each nail plate, and may generate the artificial nail model from the reference artificial nail model, the shape of the side of the nail plate of which has been adjusted.

The model-generating unit 130 may determine the scale value of the artificial nail model corresponding to the standard specification object based on the coordinate values of the artificial nail model and the coordinate values of the standard specification object.

Also, the model-generating unit 130 may determine the scale value of the artificial nail model by comparing the coordinate values of each nail and the standard specification object, which are taken together in the first image, the second image, and the third image, and may then calculate the actual size of the artificial nail model.

Here, the model-generating unit 130 may designate that the nail and the standard specification object, taken in the first image, are located in an X-Y plane of a 3D coordinate system, may calculate the extent of curvature of the nail tip and the extent of curvature of the side of the nail plate based on the coordinate values recognized from the shape of the nail tip in the second image and the coordinate values recognized from the shape of the side of the nail plate in the third image, and may calculate a scalar space for which the extent of curvature of the nail tip and the extent of curvature of the side of the nail plate are calculated as coordinates on a Z axis with respect to the X-Y plane, thus enabling the artificial nail model in the 3D coordinate system to be generated.

Referring to FIG. 8, it can be seen that detailed adjustment of the artificial nail model according to an embodiment of the present disclosure is depicted.

For example, the model-generating unit 130 may finely adjust the thickness, horizontal curvature height, vertical curvature height, and nail length of the generated artificial nail model in millimeters (mm). Also, additional parameters may be further included and adjusted, and the units of detailed adjustment are not limited thereto.

Here, the model-generating unit 130 may deliver data about the finally generated artificial nail model to the user through a download function (DOWNLOAD), and may store the artificial nail model through a project-saving function (SAVE PROJECT).

In this case, the model-generating unit 130 may generate the artificial nail model in the form of a 3D model file (e.g. a stereolithography (STL) file or the like) that can be 3D-printed.

Also, the model-generating unit 130 may transfer the image data used in a procedure for generating the artificial nail model, the coordinate values, and the parameters adjusted from the reference artificial nail model to the image-learning unit 140 in order to generate learning data from the image data, the coordinate values, and the adjusted parameters.

The image-learning unit 140 may generate learning data by learning the image data and the coordinate values, which are used to generate the artificial nail model, and the parameters, which are adjusted from the reference artificial nail model, and may provide the learning data to the model-generating unit 130.

Here, the model-generating unit 130 may more effectively determine the shape and scale value of the artificial nail model in a 3D coordinate system using the learning data.

Figure 9:
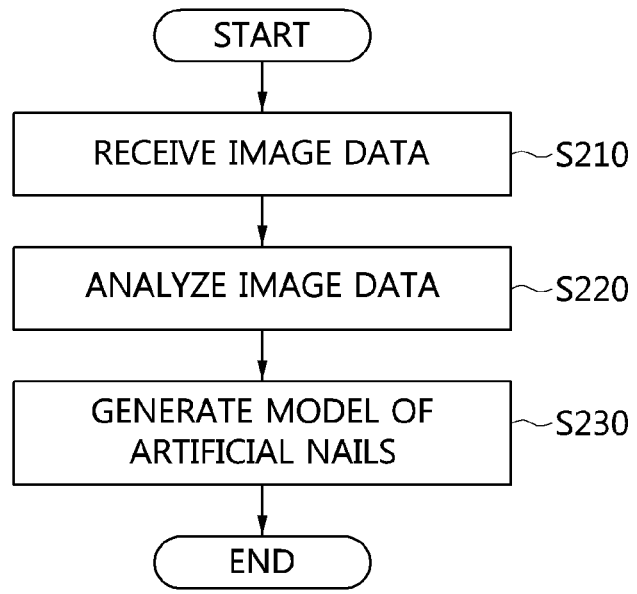
FIG. 9 is an operation flowchart illustrating a model reconstruction method using photogrammetry according to an embodiment of the present disclosure.
Figure 10:
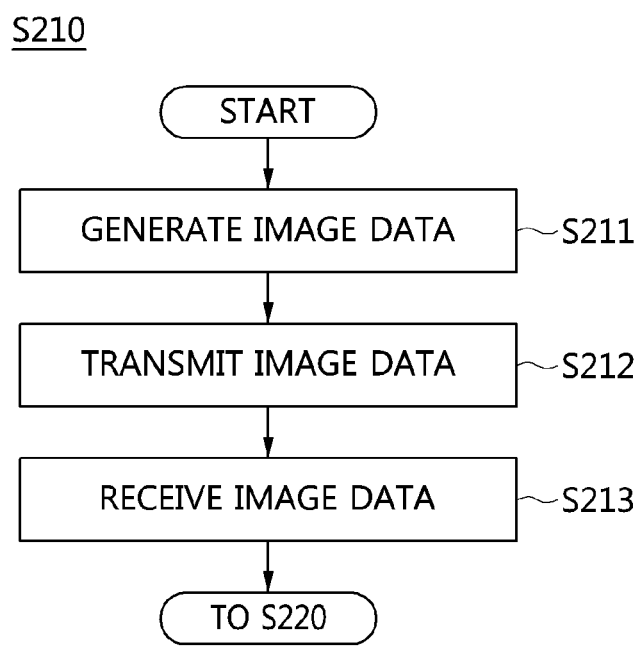
FIG. 10 is an operation flowchart illustrating in detail an example of the image data-receiving step of FIG. 9.
Figure 11:
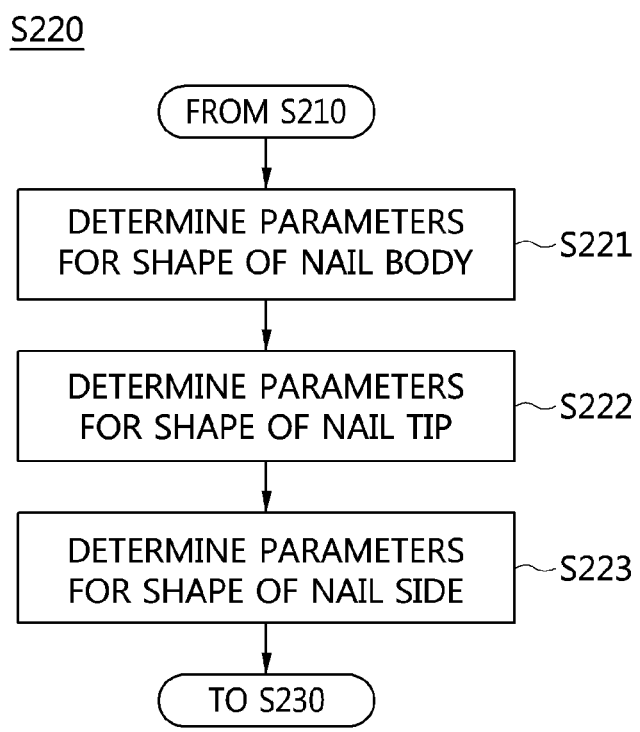
FIG. 11 is an operation flowchart illustrating in detail an example of the image data-analyzing step of FIG. 9.
Figure 12:
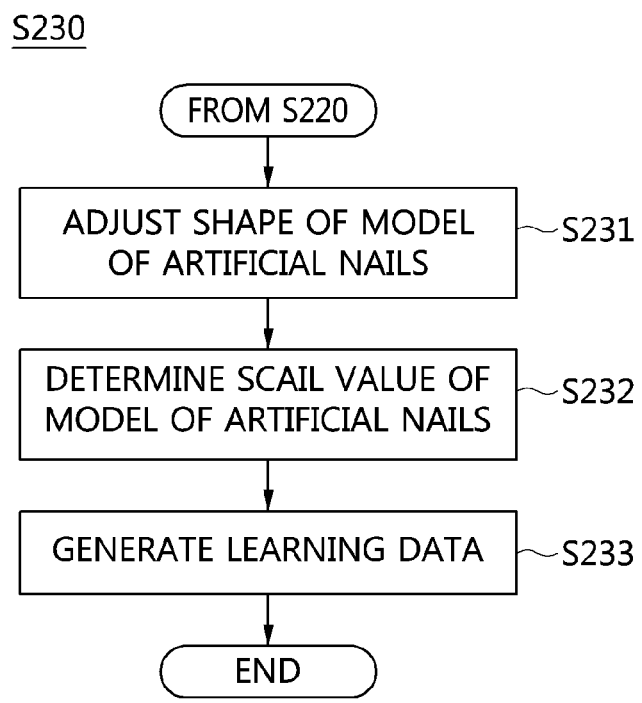
FIG. 12 is an operation flowchart illustrating in detail an example of the artificial nail model-generating step of FIG. 9.

FIG. 9 is an operation flowchart illustrating a model reconstruction method using photogrammetry according to an embodiment of the present disclosure. FIG. 10 is an operation flowchart illustrating in detail an example of the image data-receiving step of FIG. 9. FIG. 11 is an operation flowchart illustrating in detail an example of the image data-analyzing step of FIG. 9. FIG. 12 is an operation flowchart illustrating in detail an example of the artificial nail model-generating step of FIG. 9.

Referring to FIG. 9, the model reconstruction method using photogrammetry according to the embodiment of the present disclosure may receive image data at step S210.

That is, at step S210, image data in which images of the nails of a target, for which an artificial nail model is to be generated, and a standard specification object are taken together may be received.

Referring to FIG. 10, in a procedure at step S210, the image data may be generated at step S211.

That is, at step S211, a user terminal device may generate the image data by taking an image of the nails of the target together with the standard specification object.

Here, the image data may be generated using various types of user terminal devices, such as a smartphone, a smart tablet, or a digital camera, which can take a two-dimensional (2D) digital image and then generate image data.

For example, at step S211, the user terminal device may request the user to generate image data needed to generate the artificial nail model under the guidance of an application, software or a website for providing an artificial nail model generation service.

At step S211, the application, software, or website for providing the artificial nail model generation service may output information needed to generate the artificial nail model as a message through the user terminal device.

The information needed to generate the artificial nail model may include a message for explaining a method for taking an image of the target's hand in order to generate the artificial nail model, and the like.

At step S211, the application, software, or website for providing the artificial nail model generation service may control the user terminal device so that image data needed to generate the artificial nail model is taken using a built-in camera installed in the user terminal device.

Further, in the procedure at step S210, the image data may be transmitted at step S212.

That is, at step S212, the user terminal device may transmit the image data to the model reconstruction apparatus using photogrammetry over a network.

Here, at step S212, the user terminal device may also upload the image data onto the application, software, or website for providing the artificial nail model generation service.

Furthermore, in the procedure at step S210, the image data may be received at step S213.

That is, at step S213, the image data may be received from the user terminal device over the network, or alternatively, the image data, uploaded by the user to request the generation of artificial nails, may be downloaded from the application, software, or website for providing the artificial nail model generation service.

Here, the image data may include a first image for recognizing the shape of each nail body (i.e. each nail plate) and a second image for recognizing the shape of each nail tip (i.e. the free edge of each nail).

It can be seen that FIGS. 2 and 3 illustrate examples of the first image, and that FIG. 4 illustrates an example of the second image.

Referring to FIGS. 2 to 4, the first image and the second image may be taken in the state in which a standard specification object is in close contact with the bottoms of the fingers of the target.

In particular, as illustrated in FIGS. 2 and 3, the first image may be obtained by taking an image of the nail plates of the target together with the standard specification object from a viewpoint in which the back of the target's hand is viewed.

Further, the first image may include an image taken in the state in which the bottom of the thumb of a left hand is in close contact with the standard specification object from a viewpoint in which the back of the target's hand is viewed, an image taken in the state in which the bottoms of the remaining four fingers of the left hand are in close contact with the standard specification object from a viewpoint in which the back of the target's hand is viewed, an image taken in the state in which the bottom of the thumb of a right hand is in close contact with the standard specification object from a viewpoint in which the back of the target's hand is viewed, and an image taken in the state in which the bottoms of the remaining four fingers of the right hand are in close contact with the standard specification object from a viewpoint in which the back of the target's hand is viewed.

In particular, as illustrated in FIG. 4, the second image may be obtained by taking an image of nail tips (free edges of nails) together with the standard specification object from a viewpoint in which the fingertips of the target are viewed.

Here, the second image may include a left hand image and a right hand image taken in the state in which the bottom of the thumb of the target's corresponding hand is in close contact with one surface of the standard specification object and in which all of the bottoms of the remaining four fingers are in close contact with the other surface of the standard specification object.

Here, in the case of the second image, the image of the fingertips of the target must be taken from a viewpoint opposite the direction in which the fingers are extended in order to recognize the extents to which the nail tips are curved (i.e. the extents of curvature of the nail tips).

Also, the image data may further include a third image obtained by taking an image of the sides of the fingers in order to recognize the extents to which nail plates are curved.

The standard specification object may be an object made based on international standards.

For example, the standard specification object may be an object manufactured based on international standards developed by the International Organization for Standardization (ISO), and the object manufactured based on the international standards may be any of various objects such as credit cards, bills, coins, and paper.

A credit card will be described below as an example of the standard specification object according to the embodiment of the present disclosure.

Next, the model reconstruction method using photogrammetry according to the embodiment of the present disclosure may analyze the image data at step S220.

That is, at step S220, the shapes of nail plates and nail tips of the nails of the target may be recognized from the image data, and parameters for the shapes of nail plates and the shapes of nail tips may be determined based on the standard specification object.

Referring to FIG. 5, at step S220, the shapes of the nail plates may be recognized from the first image from a viewpoint in which the back of the hand is viewed, and parameters for the shapes of the nail plates may be determined based on the standard specification object.

Referring to FIG. 11, in a procedure at step S220, parameters for the shape of each nail plate may be determined first at step S221. That is, at step S221, at least four points may be set on the nail wall of each nail plate in the first image, from a viewpoint in which the back of the target's hand is viewed, and then the parameters may be determined using the at least four points as coordinate values for the shape of the corresponding nail plate.

Here, at step S221, the type of nail shape of at least one selectable artificial nail model may be determined based on the shape of the nail plate recognized from the first image from a viewpoint in which the back of the target's hand is viewed.

Referring to FIG. 6, it can be seen that the types of nail shapes of the artificial nail models, which are selectable by the model reconstruction apparatus using photogrammetry according to the embodiment of the present disclosure, are depicted.

The types of nail shapes according to the embodiment of the present disclosure may include a square shape, a square oval, squoval or semi-square shape, a rounded shape, an oval shape, an almond shape, a ballerina or coffin shape, and a stiletto shape, and may further include additional nail shapes.

Here, at step S221, one or more of the nail shapes of the artificial nail model may be selected in order to recommend the nail shape of an artificial nail model to the user by comparing the recognized shape of the nail plate of the target with the nail plate of the reference artificial nail model, and the selected nail shapes of the artificial nail model may be recommended to the user through the user terminal device.

For example, at step S221, when the length of the nail of a target is longer than that of the nail of the reference artificial nail model, a square, square oval, squoval or semi-square shape may be selected. When the length of the nail of the target is less than that of the nail of the reference artificial nail model, a rounded shape may be selected. When the width of the nail of the target is less than that of the nail of the reference artificial nail model, an oval or almond shape may be selected.

Further, in the procedure at step S220, parameters for the shape of each nail tip may be determined at step S222.

That is, at step S222, the shape of each nail tip may be recognized from the second image from a viewpoint in which the fingertips of the target are viewed, and parameters for the shape of the nail tip may be determined based on the standard specification object.

Referring to FIG. 7, at step S222, two points may be set at positions corresponding to both sides of each nail from the second image in such a way as to set one point per position from a viewpoint in which the fingertips of the target are viewed, an additional point may be set at at least one position on the nail tip, and then the parameters may be determined using the two points and the additional point as coordinate values for the shape of the nail tip.

At step S222, a straight line connecting the two points may be generated, and a point on the nail tip, which is perpendicular to that straight line and meets a perpendicular line passing through the nail plate of the target, may be set as the additional point.

Here, at step S222, two points may be set on the standard specification object, a straight line connecting the two points may be generated, and the locations of coordinate values for the shape of the nail tip may be adjusted using the slope of the straight line generated on the standard specification object.

Furthermore, in the procedure at step S220, parameters for the shape of the side of each nail may be determined at step S223.

The shape of each nail side, taken from a viewpoint in which the sides of the fingers of the target are viewed, may be recognized from the third image, and parameters for the shape of the nail side may be determined.

Here, at step S223, two points may be set at the nail tip (free edge) and the nail root of the nail plate in the third image in such a way as to set one point at the nail tip and the other point at the nail root from a viewpoint in which the side of each finger is viewed, an additional point may be set at at least one position on the nail plate, and then the parameters may be determined using the two points and the additional point as coordinate values for the shape of the nail side.

At step S223, a straight line connecting the two points may be generated, and a position on the nail plate, which is perpendicular to that straight line and meets a perpendicular line passing through the nail plate of the target, may be set as the additional point.

At step S223, two points may be set on the standard specification object, a straight line connecting the two points may be generated, and the locations of coordinate values for the shape of the nail side may be adjusted using the slope of the straight line generated in the standard specification object.

In this case, the execution sequence of steps S221, S222, and S223 included in step S220 may also be changed.

Next, the model reconstruction method using photogrammetry according to the embodiment of the present disclosure may generate an artificial nail model at step S230.

That is, at step S230, the artificial nail model may be generated based on the parameters.

Referring to FIG. 12, in a procedure at step S230, an artificial nail model may be generated by adjusting the shape of a reference nail model at step S231.

At step S231, the shape of each nail plate for the reference artificial nail model may be adjusted based on the coordinate values for the shape of each nail plate, and the artificial nail model may be generated from the reference artificial nail model, the shape of the nail plate of which has been adjusted.

At step S231, the shape of each nail tip of the reference artificial nail model may be adjusted based on the coordinate values for the shape of each nail tip, and the artificial nail model may be generated from the reference artificial nail model, the shape of the nail tip of which has been adjusted.

At step S231, the shape of the side of each nail plate of the reference artificial nail model may be adjusted based on the coordinate values for the shape of the side of each nail plate, and the artificial nail model may be generated from the reference artificial nail model, the shape of the side of the nail plate of which has been adjusted.

Also, in the procedure at step S230, the scale value of the artificial nail model may be determined at step S232.

That is, at step S232, the scale value of the artificial nail model corresponding to the standard specification object may be determined based on the coordinate values of the artificial nail model and the coordinate values of the standard specification object.

Also, at step S232, the scale value of the artificial nail model may be determined by comparing the coordinate values of each nail and the standard specification object, which are taken together in the first image, the second image, and the third image, and the actual size of the artificial nail model may then be calculated.

At step S232, the nail and the standard specification object, taken in the first image, may be designated to be located in an X-Y plane of a 3D coordinate system, the extent of curvature of the nail tip and the extent of curvature of the side of the nail plate may be calculated based on the coordinate values recognized from the shape of the nail tip in the second image and the coordinate values recognized from the shape of the side of the nail plate in the third image, and a scalar space for which the extent of curvature of the nail tip and the extent of curvature of the side of the nail plate are calculated as coordinates on a Z axis with respect to the X-Y plane may be calculated, thus enabling the artificial nail model in the 3D coordinate system to be generated.

Referring to FIG. 8, it can be seen that detailed adjustment of the artificial nail model according to an embodiment of the present disclosure is depicted.

For example, at step S232, the thickness, horizontal curvature height, vertical curvature height, and nail length of the generated artificial nail model may be finely adjusted in millimeters (mm). Also, additional parameters may be further included and adjusted, and the units of detailed adjustment are not limited thereto.

Here, at step S232, data about the finally generated artificial nail model may be delivered to the user through a download function (DOWNLOAD), and the artificial nail model may be stored through a project-saving function (SAVE PROJECT).

In this case, the artificial nail model may be generated in the form of a 3D model file (e.g. a stereolithography (STL) file or the like) that can be 3D-printed.

Also, in the procedure at step S230, learning data may be generated at step S233.

That is, at step S233, the learning data may be generated from the image data and the coordinate values, which are used in a procedure for generating the artificial nail model, and the parameters, which are adjusted from the reference artificial nail model.

Here, at step S233, the learning data may be generated by learning the image data and the coordinate values, which are used to generate the artificial nail model, and the parameters, which are adjusted from the reference artificial nail model.

Here, the learning data may be used at steps S231 and S232, thus enabling the shape and the scale value of the artificial nail model in a 3D coordinate system to be more effectively determined.

Figure 13:
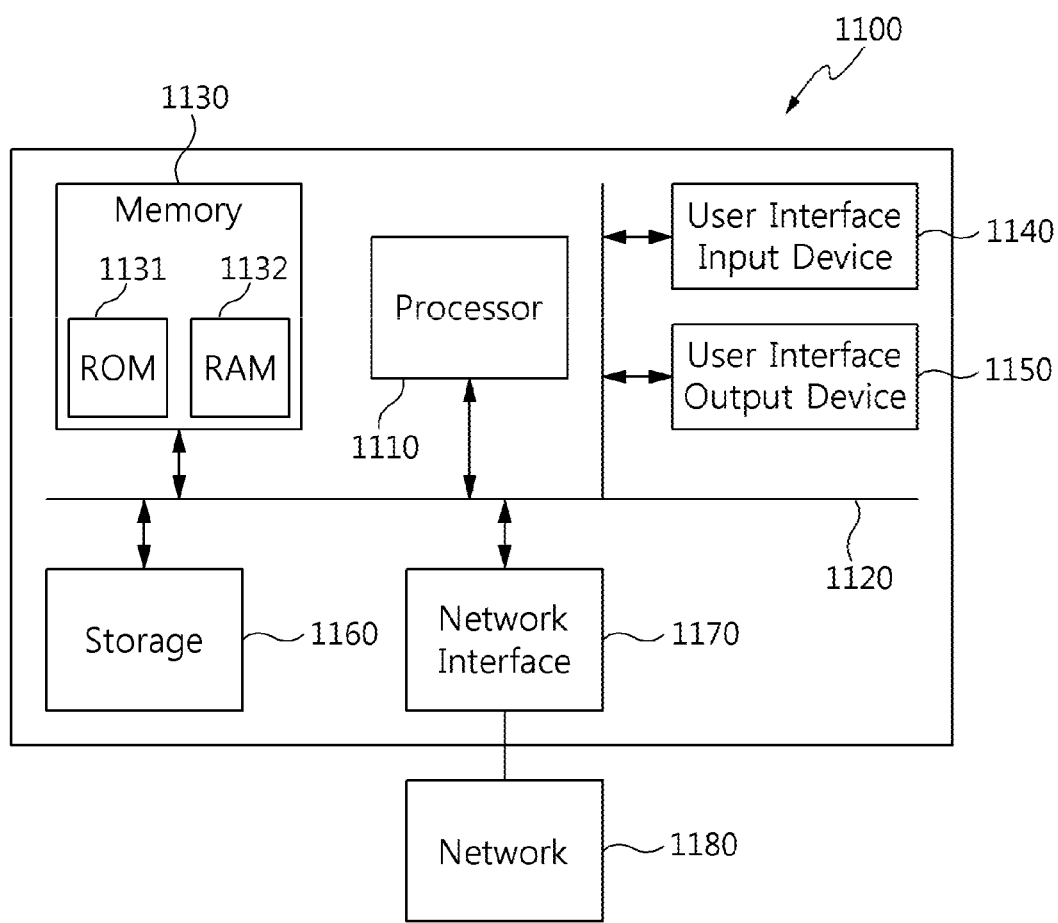
FIG. 13 is a diagram illustrating a computer system according to an embodiment of the present disclosure.

FIG. 13 is a diagram illustrating a computer system according to an embodiment of the present disclosure.

Referring to FIG. 13, a model reconstruction apparatus using photogrammetry according to the embodiment of the present disclosure may be implemented in a computer system 1100 such as a computer-readable storage medium. Also, as illustrated in FIG. 13, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each of the processors 1110 may be either a Central Processing Unit (CPU) or a semiconductor device which executes processing instructions stored in the memory 1130 or the storage 1160. Each of the memory 1130 and the storage 1160 may be any of various types of volatile or nonvolatile storage media. For example, the memory may include Read-Only Memory (ROM) 1131 or Random Access Memory 1132.

The present disclosure may conveniently and simply provide a user-customized artificial nail model suitable for a user.

Further, the present disclosure may generate a user-customized artificial nail model from a reference artificial nail model that complies with existing standard specifications without requiring a complicated process or special tool.

As described above, in the model reconstruction apparatus and method using photogrammetry according to the present disclosure, the configurations and schemes in the above-described embodiments are not limitedly applied, and some or all of the above embodiments can be selectively combined and configured such that various modifications are possible.

What is claimed is:

1. A model reconstruction system, comprising:
   at least one processor and at least one memory, the at least one memory comprising instructions executable by the at least one processor to:
   receive image data of a nail of a target with a standard specification object wherein the image data comprises a first image and a second image, wherein the first image comprises an image of a nail plate of the target and the second image comprises an image of a nail tip of the target;
   recognize a first shape of the nail plate of the nail from the first image and a second shape of the nail tip of the nail from the second image;
   determine a first set of parameters based on the first shape and a second set of parameters based on the second shape;
   adjust a third shape of a first artificial nail model to comply with the first set of parameters and the second set of parameters; and
   generate a nail model for the nail, wherein the nail model comprises the third shape of the first artificial nail model.

2. The model reconstruction system of claim 1, wherein the standard specification object is one of a credit card, a currency note, a coin, and a paper.

3. The model reconstruction system of claim 1, wherein the first image and the second image comprise the standard specification object in contact with a finger of the target.

4. The model reconstruction system of claim 3, wherein the first image is obtained from a viewpoint in which a back of a hand of the target is viewed.

5. The model reconstruction system of claim 4, wherein the instructions to determine the first set of parameters further comprise instructions to:
   determine respective coordinate values of at least four wall points on a nail wall of the nail plate in the first image, wherein the at least four wall points represent the first shape.

6. The model reconstruction system of claim 3, wherein the second image is obtained from a viewpoint in which a fingertip of the target is viewed.

7. The model reconstruction system of claim 6, wherein the second image comprises a thumb of the target in contact with a first surface of the standard specification object, and at least one fingertip of the target in contact with a second surface of the standard specification object.

8. The model reconstruction system of claim 7, wherein the instructions to determine the second set of parameters further comprise instructions to:
   determine respective coordinate values of at least two side points at positions corresponding to both sides of the nail in the second image and one top point at one position on the nail tip, wherein the two side points and one top point represent the second shape.

9. The model reconstruction system of claim 8, wherein the instructions to determine the second set of parameters further comprise instructions to:
generate a straight line connecting the two side points; and
set the top point perpendicular to the straight line, wherein a line connecting the top point and a midpoint of the straight line is perpendicular to the straight line.

10. The model reconstruction system of claim 1, wherein the instructions further comprise instructions to:
perform a comparison between the first shape and a fourth shape representing a second artificial nail model;
select at least one of a fifth shape and a sixth shape on the comparison, wherein the fifth shape represents a third artificial nail model and the sixth shape represents a fourth artificial nail model; and
recommend said at least one of the fifth shape and the sixth shape to the target, wherein said at least one of the fifth shape and the sixth shape is provided to the target through a user terminal device.

11. The model reconstruction system of claim 10, wherein the comparison comprises at least one of comparing a first length of the nail of the target with a second length of the nail of the second artificial nail model and comparing a first width of the nail of the target with a second width of the nail of the second artificial nail model.

12. The model reconstruction system of claim 10, wherein said at least one of the fifth shape and the sixth shape is one of square, square oval, round, oval, almond, ballerina, and stiletto.

13. The model reconstruction system of claim 1, wherein the instructions further comprise instructions to:
recognize a seventh shape of a nail side of the target based on the image data wherein the image data further comprises a third image for recognizing the seventh shape;
determine a third set of parameters based on the seventh shape; and
adjust the third shape to comply with the third set of parameters.

14. The model reconstruction system of claim 13, wherein the third image comprises an image of the nail side of the target from a viewpoint in which a side of a finger of the target is viewed.

15. The model reconstruction system of claim 1, wherein the instructions further comprise instructions to:
generate learning data comprising at least one of the image data and one or more of the parameters, wherein the learning data is used to determine a eighth shape representing a fifth artificial nail model.

16. A model reconstruction system, comprising:
at least one processor and at least one memory, the at least one memory comprising instructions executable by the at least one processor to:
receive image data of a nail of a target with a standard specification object from a user terminal device;
recognize a first shape of a nail plate of the nail from the image data;
determine a first parameter based on the first shape;
perform a comparison between the first shape and a second shape, wherein the second shape represents a first artificial nail model;
select at least one of a third shape and a fourth shape based on the comparison, wherein the third shape represents a second artificial nail model and the fourth shape represents a third artificial nail model; and
recommend said at least one of the third shape and the fourth shape to the target, wherein said at least one of the third shape and the fourth shape are provided to the target through the terminal device.

17. The model reconstruction system of claim 16, wherein the comparison further comprises comparing the first parameter with a second parameter, wherein the second parameter defines the second shape.

18. The model reconstruction system of claim 17, wherein the first parameter is one of a first width of the nail of the target and a first length of the nail of the target.

19. The model reconstruction system of claim 17, wherein the second parameter is one of a second width of a nail of the first artificial nail model and a second length of the nail of the first artificial nail model.

20. The model reconstruction system of claim 16, wherein said at least one of the third and the fourth shapes is one of square, square oval, round, oval, almond, ballerina, and stiletto.

* * * * *